Patented June 9, 1925.

1,541,176

UNITED STATES PATENT OFFICE.

IWAN OSTROMISLENSKY, OF NEW YORK, N. Y., ASSIGNOR TO THE NAUGATUCK CHEMICAL COMPANY, OF NAUGATUCK, CONNECTICUT, A CORPORATION OF CONNECTICUT.

PROCESS FOR THE MANUFACTURE OF STYROL OR ITS HOMOLOGUES.

No Drawing.    Application filed May 7, 1924. Serial No. 711,587.

*To all whom it may concern:*

Be it known that I, IWAN OSTROMISLENSKY, a citizen of Russia, residing in New York, county and State of New York, have invented certain new and useful Improvements in Processes for the Manufacture of Styrol or Its Homologues, of which the following is a full, clear, and exact description.

This invention relates to processes for the manufacture of styrol or its homologues, particularly to its manufacture from aromatic substances other than hydrocarbons.

The principal object of the invention is to provide a simple practical process for manufacturing styrol or its homologues which shall have relatively few steps involved for the production of a material of great purity.

The invention accordingly comprises a process for the manufacture of styrol or its homologues which includes heating a substance having the general formula

at approximately 250° C. to 650° C., exclusive of the temperature range 300° C. to 500° C. and partially decomposing the substance to form a substance having the formula $ArCH:CH_2$. In the formulæ the symbol Ar stands for aryl.

In accordance with the invention it has been found that styrol may be formed directly by pyrogenic decomposition of cinnamic acid, decomposition being governed principally by the temperature at which the process is carried out.

In carrying out the invention in its preferred form, 1 kilo of cinnamic acid is heated on a bath under normal pressure at approximately 295–298° C. Styrol is formed and passes as a vapor into an air-condenser. During the process a current of nitrogen or carbon dioxide or other inert gas serving as a carrier for the vapors may be passed through the apparatus. As a condenser an inclined tube is used provided with a receiver at its open end into which the liquid products flow and a reflux condenser for condensing and returning to the receiver any vapors passing thereinto. Heating is continued for 3–5 hrs. at the end of which time about 400 grams of styrol are collected. This material is then purified. The reaction takes place smoothly and quickly and the styrol formed is rapidly removed from the zone of its formation. It is important that this rapid removal occur, otherwise the styrol formed is apt to undergo a change with a consequent reduction in the yield. There is left behind in the vessel in which the cinnamic acid is heated a residue which is preferably heated to 600° C. in accordance with the procedure described below for the treatment of cinnamic acid at 580–640° C. to obtain a further yield of impure styrol.

In order to purify the impure styrol obtained, the following procedure is carried out: The styrol is shaken up in a solution of water and alkali and this mixture is then distilled with steam. The styrol passing into the receiving vessel is separated from water in a separating device and is then partially dried by adding calcium chloride thereto. If the styrol was obtained by heating the cinnamic acid at a temperature not higher than 295°–298° the above method of purification is sufficient. The yield of pure styrol is 35% to 45% by weight based on the original cinnamic acid. The yield of purified styrol by the combined processes is approximately 70% of the original amount of cinnamic acid taken, or in other words almost the theoretical yield.

Heating of cinnamic acid may also be carried out, preferably in nitrogen, carbon dioxide or similar gas at a temperature of 580° C. to 640° C. In carrying out this process 58.5 kilos cinnamic acid in melted condition are poured into a reaction tube, through a valved conduit, the tube and valved conduit being located in a special metal preheater suitably heat-insulated with sheet asbestos. The valve is employed to regulate the speed with which the melted cinnamic acid passes into the reaction chamber. The temperature inside the preheater varies between 133–150° C. in order to maintain the cinnamic acid in melted condition. At a higher temperature decomposition of the cinnamic acid would be apt to take place with the formation of cinnamic acid anhydride and other products, and at a lower temperature the cinnamic acid would freeze to a crystalline mass. The reaction chamber into which the cinnamic acid passes is maintained at approximately 600° C. The amount of cinnamic acid passing into the reaction chamber is preferably regulated at 0.8 kilos per minute. Heating is continued for approximately 72 hrs. During the course of the process a current of nitrogen is passed through the reaction chamber at a speed of 84 litres per minute. At the end of this time approximately 38.6 kilos of crude styrol is obtained.

The purification of this crude styrol is carried out in the same manner as indicated above for the purification of styrol resulting from the processes as carried out at 295–298° C.

However, it is desirable in addition to treat the product, after it has been subjected to the purification described for the styrol prepared from cinnamic acid at 295–298° C. with a small amount of metallic sodium, after removal of the calcium chloride. The sodium is allowed to remain for 15–20 hours at ordinary temperatures in the styrol. The styrol is then subjected to slow distillation in a dephlegmator in vacuo (say 15–25 mm. pressure). The lower boiling fraction of the distillation, approximately 5–8% of the weight of the original styrol, is collected separately, and the dephlegmator is then removed, and the remainder of the mass is distilled and collected. The 5 to 8% fraction is double fractionally distilled, and styrol boiling at 142° C. is collected therefrom and added to the styrol obtained by the main distillation just mentioned.

Various other temperatures may be employed for carrying out the decomposition of cinnamic acid. It has been found however that with a temperature considerably below that of 295° C. with normal pressure utilizing substantially the same conditions as pertaining in the decomposition carried out at 295–298° C. in the process described above, the yield of styrol obtained was approximately 35%–45%. At the boiling point of cinnamic acid, 300° C., if prolonged boiling is carried out the yield is reduced to about 5–10%. When the temperature is raised to between the boiling point of cinnamic acid and 500° C. the reaction either does not yield styrol at all or else in negligible quantity. This temperature range between the boiling point and 500° C., may be referred to as a "danger zone" in which decomposition occurs with the production of many kinds of substances, but not styrol. When the temperature is below the boiling point or is raised to 580–640° C. practical yields of styrol are obtained. In other words I have found that cinnamic acid heated from approximately 250° C. to approximately 640° C. with the exception of the range between the boiling point of cinnamic acid and 500° C. gives practicable yields of styrol.

The cinnamic acid employed may be derived from storax and other natural sources or may be made synthetically as for example from toluol, chlorine and sodium acetate.

Although cinnamic acid has been mentioned as a preferred material having the formula ArCH:CH.COOH, various homologues of cinnamic acid such as ortho and para-methyl cinnamic acid may be similarly employed.

The purified styrol and its homologues obtained in accordance with the above procedure may be polymerized to produce vitreous polymerized styrol as set forth in my copending application Serial No. 711,584 filed May 7, 1924.

As many apparently widely different embodiments of this invention may be made without departing from the spirit thereof, it will be understood that I do not intend to limit myself to the specific embodiment herein set forth except as indicated in the appended claims.

Having thus described my invention, what I claim and desire to protect by Letters Patent is:

1. A process for the manufacture of ArCH:CH$_2$ where Ar represents aryl, which comprises decomposing ArCH:CH.COOH in two stages at widely separated temperature ranges lying below and considerably above the boiling point of the Ar.CH:CH.COOH.

2. A process for the manufacture of ArCH:CH$_2$, where Ar represents aryl which comprises heating a substance having the general formula ArCH:CH.COOH at approximately 250° C. to 650° C., exclusive of the temperature range 300° C. to 500° C. and partially decomposing the substance to form a substance having the formula ArCH:CH$_2$.

3. A process for the manufacture of styrol, which comprises heating cinnamic acid at approximately 250° C. to 650° C. exclusive of the temperature range 300–500° C., and partially decomposing it to form styrol.

4. A process for the manufacture of styrol, which comprises heating cinnamic acid in a vessel at normal pressure at approximately 250° C. to 650° C. exclusive of the temperature range 300–500° C. while conducting a current of an inert gas through said vessel, and partially decomposing the cinnamic acid to form styrol.

5. A process for the manufacture of styrol, which comprises allowing melted cinnamic acid to flow at a predetermined rate into a vessel maintained at normal pressure having a temperature of approximately 250° C. to 650° C. exclusive of the temperature range 300° C. to 500° C., decomposing the cinnamic acid to form styrol, and rapidly conducting away the styrol vapors from the region of the undecomposed cinnamic acid.

6. A process for the manufacture of styrol, which comprises allowing cinnamic acid to flow at a predetermined rate into a vessel maintained at normal pressure having a temperature of approximately 295° C. to 298° C., decomposing the cinnamic acid to form styrol, and rapidly conducting away the styrol vapors from the region of the undecomposed cinnamic acid.

7. A process for the manufacture of styrol which comprises dropping melted cinnamic acid at a predetermined rate into a receiving chamber at normal pressure heated to 295° C. to 298° C., decomposing the cinnamic acid to form styrol, conducting the vapors of styrol away rapidly from the undecomposed cinnamic acid, condensing the vapors to form crude styrol, steam distilling the crude styrol, separating the styrol from the distillate, and fractionally distilling to purify it.

Signed at New York, New York, this 3rd day of May 1924.

IWAN OSTROMISLENSKY.